United States Patent [19]

Irwin

[11] Patent Number: 4,496,954

[45] Date of Patent: Jan. 29, 1985

[54] RESERVO INTERVAL DETERMINATION IN AN INK JET SYSTEM

[75] Inventor: John W. Irwin, Georgetown, Tex.

[73] Assignee: International Business Machines Corporation, Armonk, N.Y.

[21] Appl. No.: 450,416

[22] Filed: Dec. 16, 1982

[51] Int. Cl.[3] .............................................. G01D 15/18
[52] U.S. Cl. ......................................... 346/1.1; 346/75
[58] Field of Search .................................. 346/75, 1.1

*Primary Examiner*—E. A. Goldberg
*Assistant Examiner*—Gerald E. Preston
*Attorney, Agent, or Firm*—Homer L. Knearl; Carl M. Wright

[57] ABSTRACT

Optimal reservoing times of an ink jet printer are determined to be when an optimal time period exceeds a fixed maximum value, where the optimal time period is proportional: to the time since last reservoing, to the usage, and to the square of temperature changes. Specifically, the optimal time period, t-opt, is $$t\text{-}opt = T + mC + kKK$$

where
T = time since last reservoing,
C = usage value,
K = temperature changes, and
m,k = empirically-determined constants.

3 Claims, 5 Drawing Figures

RESERVO INTERVAL DETERMINATION IN AN INK JET SYSTEM

INCORPORATION OF REFERENCES

U.S. Pat. No. 4,417,256, filed Mar. 22, 1982 titled "Break-Off Uniformity Maintenance", assigned to the same assignee as this patent application, is hereby incorporated by reference.

TECHNICAL FIELD

This invention relates to ink jet printers, and particularly to determination of the time that reservoing is required.

Reservoing, as used herein, refers to the adjustment of parameters in the control system of an ink jet printer to determine and to maintain the print window of the printer. The print window refers to the region of satellite-free operation as described below.

Synchronous, electrostatic, ink jet printing requires precise assembly of printhead components and the maintenance of ink jet parameters within a narrow operating range to accomplish accurate drop placement and, consequently, acceptable print quality. Multinozzle printing requires additional attention to, and control of, parameters which may create variations in nozzle-to-nozzle performance.

Some ink jet parameters can be controlled by careful machine design, precise parts machining, accurate initial setup, and regulation of specific, independently controllable parameters, e.g., ink temperature, but other ink jet properties, which depend on complex interactions, cannot. These properties must be controlled indirectly via closed-loop servo control systems.

A set of sensed parameters, controlling variables, and servo algorithms have been determined and are used in the prior art. Microprocessor-based servo systems have made reliable, high quality, ink jet printing possible in a machine application.

Because of the time required for reservoing, it is desirable not only to perform it only when necessary but also to perform it often enough to avoid degradation of print quality.

BACKGROUND ART

Ink jet technology represents a means of achieving quiet, high speed, high quality, all-points-addressable printing. These attributes make it an attractive candidate compared to other printing technologies. The primary limitations of synchronous ink jet technology and the servo systems that have been developed to maintain the ink jet operating point within these limits are fully described in the literature.

The servoing—or reservoing—of ink jet printers is well known in the art. The application incorporated by reference describes the determination of the print window, which includes setting to their optimum values the crystal drive, the ink stream velocity, and the phase of charge electrode signals.

In the prior art, reservoing was performed periodically, a common fixed period between reservoings being about 40 minutes. In some cases, reservoing is not performed until there is a visible degradation in the quality of prints. In a system using a multinozzle ink jet head, reservoing can require up to 20 seconds, even when using automatic techniques as described in the literature.

DISCLOSURE OF THE INVENTION

In accordance with the invention, the operating parameters of an ink jet printing system are initially adjusted. As the printer operates, the controller determines the optimal time period between parameter readjustments. When the determined time period equals or exceeds some predetermined maximum interval, the operating parameters are readjusted and the determining and readjustment steps are repeated while the printing system is operating.

The optimal time period is determined by $$t\text{-}opt = T + mC + kK'2$$

where t-opt = optimal reservoing time interval,
T = elapsed time since last reservoing,
m = constant,
C = number of prints produced since last reservoing,
k = temperature scaling factor, and
K = temperature change.
(K'2 indicates the square of the value K.)

By determining the reservoing periods as described, the printer operation time is maximized while the reservoing time is minimized, resulting in overall system stability, reliability, and efficiency.

DETAILED DESCRIPTION

Figure 1:
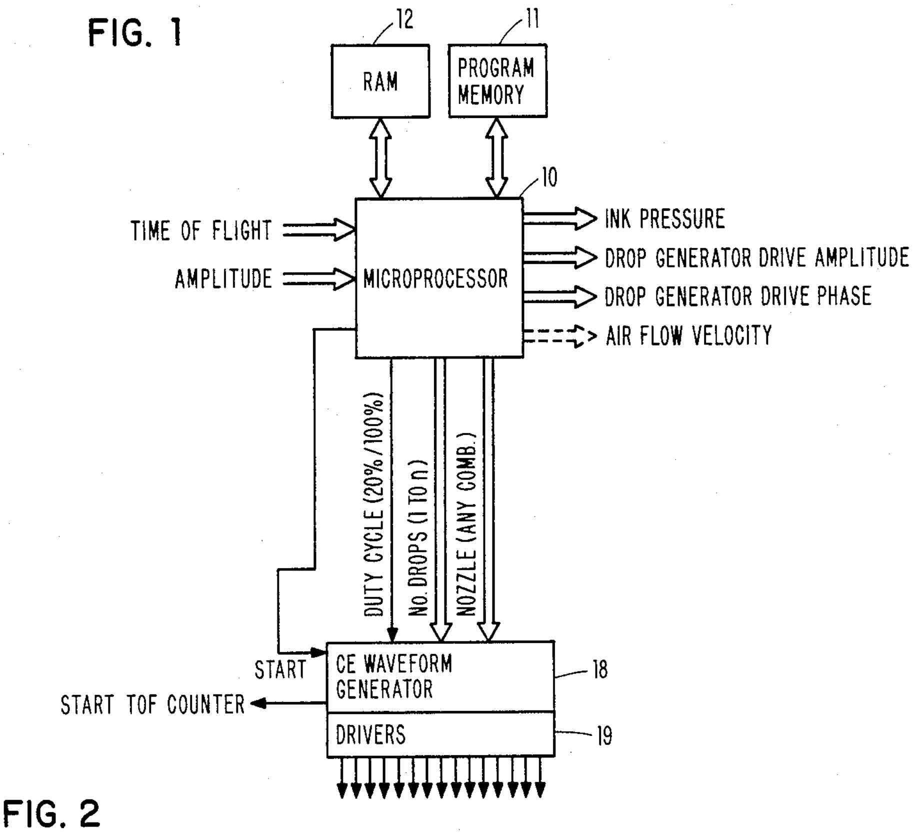
FIG. 1 is a block diagram of a microprocessor-based control system for an ink jet printer in which the invention can be implemented.

Reliable operation of a multinozzle ink jet printer depends upon strict control of the parameters affecting head performance. Some factors, such as ink specific gravity, change relatively slowly whereas others such as head temperature at power-on change rapidly. The measure of and feedback for the factors that are key to reliability are used to find and to maintain an operating window that insures reliable operation.

The parameters typically measured and controlled in a system include ink specific gravity, head temperature, time of flight (lambda), head input pressure, crystal drive voltage, crystal-to-data phasing, and stream-to-stream arrival at paper.

During startup and shutdown, all critical components are physically removed from the vicinity of the streams. The valving and porting of the head is optimized to avoid air ingestion and to prevent ink buildup on the nozzle face. The charge electrodes, deflection plates, and gutters are designed to remain clean at all times. To achieve this level of operation, the head must be constantly operated within a narrow band known as the print window. A typical microprocessor algorithm used to find and to maintain operation within this window will be briefly described.

First, it is necessary to servo the crystal drive to accommodate the large changes in ink viscosity over the machine operating temperature range. Second, since the printer could not be constantly in a self-testing mode, it is necessary to provide response to rapid condition changes such as rapid initial warm-up or the sudden arrival of newly thinned ink at the head.

Two basic parameters are measured. The time from drop-charging to zero-cross of the waveshape as the charged drops pass a sensing wire provides time-of-flight, lambda.

The amplitude of the sensed waveshape provides an estimate of induced charge and can therefore be used to estimate breakoff spread and data-to-crystal phasing. To provide a better indication of breakoff, the period of charging is reduced from the normal charging period when running phase checks.

The following is a plain-language outline of a possible processor servoing algorithm:

1. Set an estimated crystal drive.
   a. If initial bringup, use a stored low value and offset.
   b. If head has been up, use last servoed drive.
2. Turn on pressure and vacuum pumps.
3. Perform specific gravity test. (Average of four tests is used as specific gravity.)
4. Move head to "SUPERGUTTER" startup station.
5. Perform reservoir check. (Replenish if necessary.)
6. Retract charge electrode, etc., from around nozzles.
7. Cycle on valve and crystal and wait for streams to stabilize.
8. Replace charge electrode, etc., around nozzles.
9. Move head to drop charge test station.
10. Perform automatic gain control (AGC) test to normalize drop sensor gain.
11. Servo in time-of-flight (FIG. 2B).
    a. Charge each stream in turn.
    b. Determine average flight time.
    c. Determine regulator correction.
    d. Servo regulator.
    e. Repeat until $\pm 1$ microsecond flight time.
12. Set a low crystal drive.
    a. If initial bringup, use a stored low value.
    b. If head has been up, use last servoed drive-offset.
13. Do until:
    a. Crystal high limit has been reached.
    b. An operating point has been found and lost.
       1. Perform a phasing check.
       2. Sum across all streams.
       3. Count nodes having no detected charge (null phases).
       4. Increment the crystal drive $+2$ until operating point is near, then $+1$.
       5. Operating point is greater than or equal to five null phases.
14. Select a crystal drive and set it. (Largest number of null phases approximates center of print window.)
15. Reservo time-of-flight using average of four tests for noise rejection.
16. Perform phasing check and set phase.
17. Calculate aerodynamic correction and set it.
18. Measure and store current temperature.
19. Turn on deflection voltage and gutter streams.

At this point, the printer is operational. Since parameters may rapidly change, especially on initial bringup, it is necessary to reprofile (reservo) the system at intervals. In the prior art, the interval is usually selected by storing a constant in the microcode for use in decrementing a profile counter. Sometimes, in addition to a fixed time interval, a smaller interval is used after new ink or water is added. As described below, this invention permits a more exact, variable interval to be determined.

A microprocessor control system for controlling an ink jet is illustrated in FIG. 1. A microprocessor 10 executes a suitable control program, including the servoing program described above, stored in a program memory 11. The program memory 11 is usually a read-only, nonvolatile type. A random access memory (RAM) 12 is also provided for storing operational information.

Any type of conventional microcomputer can be utilized. By way of example, the M6800 microcomputer, manufactured by Motorola Semiconductor, Inc, is a suitable microcomputer. This microcomputer has its given instruction sets, which can be utilized by one having ordinary skill in the art of programming, to generate a machine program in accordance with a series of process steps to be given hereinafter. The M6800 includes a microprocessor module coupled to adequate storage. Since this microprocessor is well known in the art details of the operation etc. will not be given hereinafter.

Figure 2:
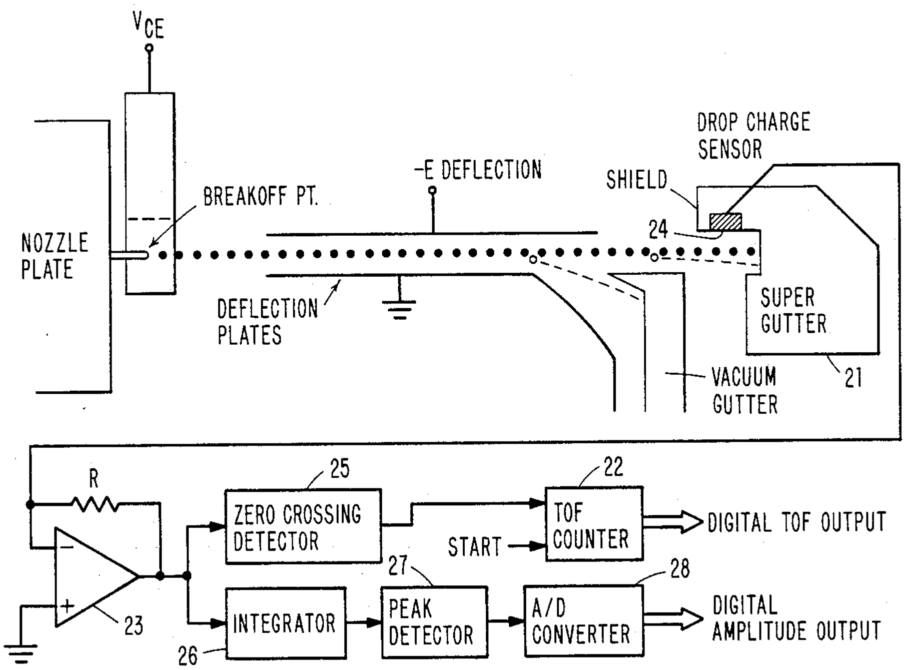
FIG. 2 is a diagram illustrating the derivation and source of input data to the control system.

Input data includes time-of-flight information and amplitude data which are acquired typically as illustrated in FIG. 2.

A crystal excitation voltage, $V_{CE}$, accelerates ink drops toward the super gutter 21. At the time the microprocessor 10 generates the $V_{CE}$ voltage, a START TOF (time-of-flight) COUNTER is supplied to the TOF counter 22.

As the charged drops pass a sensor 24, a signal is produced which is amplified by an operational amplifier 23. A zero-crossing detector 25 supplies a signal that coincides with the passing of the ink drop past the sensor 24, and the supplied signal stops the TOF counter 22.

The peak value of the charge of the drop is relative to the peak value of the signal amplified by the amplifier 23 which is integrated and detected by an integrator 26 and a peak detector 27, respectively. The value is converted to digital form by an analog-to-digital (A/D) converter 28.

As shown in FIG. 1, the time-of-flight information and the amplitude of the drop charge are supplied to the microprocessor 10. These values are used for servoing the system.

The system further includes a crystal excitation 18 which supplies the required signals to a set of ink jet drivers 19, one for each nozzle. Typical output signals to the generator 18 include a duty cycle signal, the number of drops, and the desired combination of nozzles. Other output signals from the microprocessor 10 include the ink pressure, drop generator drive amplitude, drop generator drive phase, and, sometimes, air flow velocity.

Figure 3:
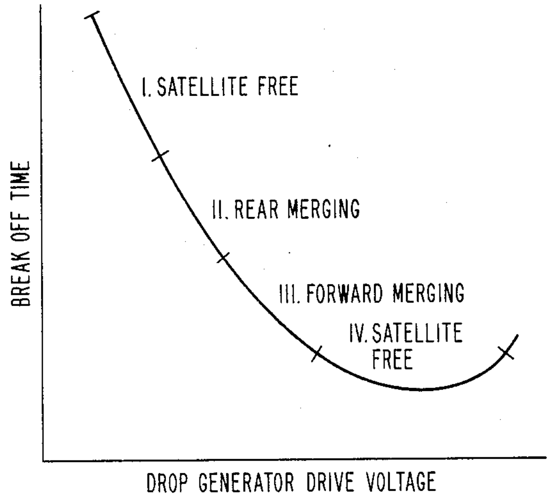
FIG. 3 is a graph illustrating a "print window."

FIG. 3 is a graph of drop break-off time versus drop generator drive voltage. The satellite-free portion of the curve, IV, represents the print window, i.e., the proper area of operation. Because of the variation of system parameters with time, as described below, the drop generator drive voltage, inter alia, must be periodically adjusted to keep the printer operation within the window. Otherwise, print quality will deteriorate, resulting in splatters, feathering, and other undesirable conditions.

Figure 4:
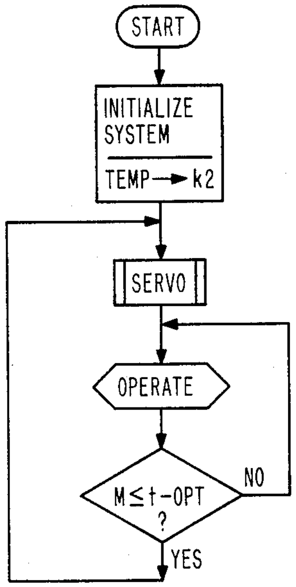
FIG. 4 is a flowchart of a general control program showing the relation of the servo subroutine to the operate module.

A high level flowchart of the operation of the system is shown in FIG. 4. The system is initialized and the servo subroutine, identified by the double-sided rectangle, is called to set the parameters for proper system functioning. The operating temperature at the completion of the SERVO subroutine is stored for use in the reservo algorithm. The system then executes an operate module, during which the printer functions to print desired documents. An internal time counter (not shown) provides a value of T, which represents the time since the system was last servoed (or reservoed). At convenient points in the operating portion of the control program, e.g., when no prints are to be made or via an interval interrupt, a maximum reservo interval, predetermined M, is compared to a calculated t-opt value which represents the optimum time interval between servoing the parameters of the system. If t-opt is greater than or equal to M, the program branches back to call the servo subroutine. Otherwise, the program branches back to the operate module of the program.

Figure 5:
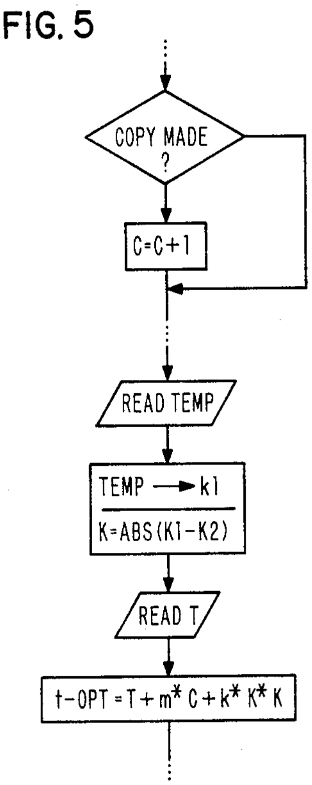
FIG. 5 is a flowchart of the determination of t-opt.

The flowchart of FIG. 5 illustrates the determination of the value of t-opt. The program depicted is presumed to be part of the operation program module of FIG. 4.

As each document is completed, a C-count is incremented. Alternatively, the C-count can be incremented for each ink drop, or pel, although, in such a case, a larger value would be required. The purpose of the C-count is to represent the amount of ink used to produce documents.

The temperature is read and stored and the absolute difference between the current temperature and the temperature value stored in K2 is calculated to derive K which represents the temperature change since the last servo cycle.

The value of T is then found and a calculation is made as follows:

$$t\text{-}opt = T + m^*C + k^*K^*K$$

where * denotes multiplication. The constants m and k are determined empirically and are highly dependent on the particular system with which used.

The factor T is proportional to the evaporation of ink. The value of C represents usage and the temperature change, K, is handled in a nonlinear fashion so that small perturbations are ignored but large changes, e.g., during the warm-up period, will have a large effect.

The variable T accounts for the evaporation characteristic of the ink. It represents the time since the last re-servoing and is measured in the same units as t-opt, usually in seconds. The value. When a reservo is performed, T is set to zero. As in the case of the C value, it is well known in the art to keep a register or stored value representing elapsed time.

The proportionality constants m and k modify the effects of the number of copies made since the last reservoing and of the temperature change since the last reservoing, respectively. These constants depend on the characteristics of the specific machine and on the representation of the values of C and K. The value of m, for example, will vary depending on whether the value of C is incremented for each pel (ink drop) or for each copy printed.

As noted, e.g., in the Abstract, the values of m and k are determined empirically. That is, a series of experiments are conducted using various values of C and K, and the values of t-opt are measured. By watching the print quality, the optimum time to reservo (t-opt) is easily determined. A series of experiments, at least two, are performed using different values of C, i.e., C(1) and C(2), K, i.e., K(1) and K(2) and noting the values of t-opt(1) and t-opt(2), respectively. This gives rise to two equations, $$t\text{-}opt(1) = T + mC(1) + kK(1)^2 \text{ and} \quad (1)$$

$$t\text{-}opt(2) = T + mC(2) + kK(2)^2 \quad (2)$$

which can be rewritten as $$mC(1) + kK(1)^2 = t\text{-}opt(1) - T \text{ and}$$

$$mC(2) + kK(2)^2 = t\text{-}opt(2) - T.$$

These equations are solved simultaneously for m and k. There are readily available subroutines, well known in the art, for solving such equations. Also, it can be easily shown that $$m = K(2)^2(t\text{-}opt(1) - T)/d - K(1)^2(t\text{-}opt(2) - T)/d \text{ and}$$

$$K = C(1)(t\text{-}opt(2) - T)/d - C(2)(t\text{-}opt(1) - T)/d \text{ where}$$

$$d - C(1)K(2)^2 - C(2)K(1)^2.$$

Since it is desirable to repeat the derminations of the values of m and k as the machine ages or as the parameters change for other reasons, it is anticipated that the program for calculating them would be stored in the microprocessor for controlling the machine.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method for improving the efficiency of operation of an ink jet printing system comprising the steps of:

adjusting initially the operating parameters of the system prior to operation;

determining, while the system is operating, the optimal time period between system parameter readjustments;

readjusting the operating parameters of the system in accordance with the determined time period; and repeating the determining and readjusting steps during system use.

2. The method of claim 1 wherein the determining step includes a step of:

calculating said optimal time period (t-opt) as T+mC+kK'2.

3. The method of claim 2 including the step of presetting a maximum reservoing interval value;

wherein the determining step includes the step of comparing the maximum reservoing interval value to the optimal time period; and wherein the readjusting step is performed only if said optimal time period is greater than or equal to said maximum reservoing interval value.

* * * * *